US006438606B1

(12) United States Patent
Ward

(10) Patent No.: US 6,438,606 B1
(45) Date of Patent: Aug. 20, 2002

(54) ROUTER IMAGE SUPPORT DEVICE

(75) Inventor: Paul Ward, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/220,870

(22) Filed: Dec. 23, 1998

(51) Int. Cl.$^7$ .......................................... G06F 15/173
(52) U.S. Cl. ....................................... 709/238; 707/10
(58) Field of Search ................................ 709/221, 230, 709/250, 223, 224, 220, 232, 228, 238, 226, 241; 713/1, 201, 2; 717/11, 4; 710/1; 714/25; 712/28; 707/1, 204, 10; 358/438

(56) References Cited

U.S. PATENT DOCUMENTS

| | | | | |
|---|---|---|---|---|
| 5,008,814 A | * | 4/1991 | Mathur ........................ 709/221 |
| 5,634,010 A | * | 5/1997 | Ciscon et al. ................ 709/223 |
| 5,634,052 A | * | 5/1997 | Morris .......................... 707/1 |
| 5,691,997 A | | 11/1997 | Lackey, Jr. ................... 371/53 |
| 5,754,763 A | * | 5/1998 | Bereiter ....................... 713/201 |
| 5,838,928 A | * | 11/1998 | Terashima ................... 709/250 |
| 5,982,507 A | * | 11/1999 | Weiser et al. ............... 358/438 |
| 6,009,274 A | * | 12/1999 | Fletcher et al. ............. 717/11 |
| 6,026,414 A | * | 2/2000 | Anglin ....................... 707/204 |
| 6,038,379 A | * | 3/2000 | Fletcher et al. ............ 709/230 |
| 6,115,713 A | * | 9/2000 | Pascucci et al. ............ 707/10 |
| 6,175,817 B1 | * | 1/2001 | Arrow et al. ................ 713/1 |
| 6,189,043 B1 | * | 2/2001 | Buyukkoc et al. .......... 709/241 |
| 6,195,695 B1 | * | 2/2001 | Cheston et al. ............. 709/221 |
| 6,205,481 B1 | * | 3/2001 | Heddaya et al. ............ 709/226 |
| 6,226,644 B1 | * | 5/2001 | Ciscon et al. .............. 707/10 |
| 6,256,673 B1 | * | 7/2001 | Gayman ..................... 709/232 |
| 6,324,584 B1 | * | 11/2001 | Mandalia ................... 709/238 |

OTHER PUBLICATIONS

Manimaran et al, A Fault–Tolerant Dynamic Scheduling Algorithm for Multiprocessor Real–Time System and Its Analysis, IEEE 11/98.*
Bastani et al, Toward Dependable Safety–Critical Software, IEEE1996.*
Tabor, Daniel Z., Jr., *FTP, TFTP, and NFS* Lesson 25, Dec. 1, 1995, New Jersey Institute of Technology; http://www.c-s.njit,edu/~cis456/protected/lesson25/single25.html#OUTL.

* cited by examiner

*Primary Examiner*—Mark H. Rinehart
*Assistant Examiner*—Thong H Vu
(74) *Attorney, Agent, or Firm*—Skjerven Morrill LLP; Samuel G. Campbell, III

(57) ABSTRACT

A multi-network system is provided with a facility for storing an old or superseded router image without the need for increasing router memory. A local storage device is coupled, directly or indirectly, to a router. Before a new image is downloaded to the router, the old or superseded image is first stored in the support device. If the new image is defective or undesirable, the old image can be recovered, even if the wide area link is unopenable, by reloading the old image from the local storage device.

21 Claims, 7 Drawing Sheets

ROUTER IMAGE SUPPORT DEVICE

The present invention relates to a support device for use in restoring a router image and in particular to a support device for local storage of at least one copy of a router operating system or image and a method of use.

BACKGROUND INFORMATION

In a multi-network computing system, routers may be used, e.g. for providing communication between two or more different networks. Typically, a first network will have a plurality of components including one or more routers and a plurality of personal computers, work stations or other computing or telecommunication devices. Such plurality of local devices may be coupled over any of a number of different types of local area networks including Ethernet, token ring networks and the like. The local router (or routers) effects communication with other networks by also being connected e.g. using a wide area network (WAN) or other link. Thus, in a typical configuration, a router will have a first connection to the local area network and one or more other connections to remote networks or sites. Thus, with respect to a given router, devices which are coupled to the same local network as the router can be termed local devices while devices or sites which are coupled to the router only via the other non-local "nominal" link can be termed remote devices.

Routers typically include a number of components such as a processor or CPU, memory, network interfaces and like. Typically at least some of the router memory is used for storing programming or software which may include an operating system or so-called "image" for the router. In many router configurations, different versions of the operating system or image maybe stored in memory so as to configure the router to provide a variety of different features or functions. Accordingly, it is typically possible to modify or upgrade the router image by storing a new or modified image (or portions thereof) in the router memory.

Not uncommonly, such new images can be downloaded from one or more remote sites over the wide area network or other remote site link. When the amount of memory available, in a router, for image-storage is less than about twice the size of the image, (an increasingly-common situation as more complex and feature-rich images are developed) storing a new image into a router involves erasing some or all of the old, previously-used image. However, if the newly-downloaded image is defective (e.g. through programming errors or through errors introduced during the download process) the router containing the newly-downloaded image may be inoperable for performing any further communications over the remote link. In such situation, it may be difficult or infeasible to restore the router to its previous functional state since the old image has been at least partially erased and the remote link is no longer available for downloading another copy of the old image from a remote site. Accordingly, it would be useful to provide a method and apparatus for returning a router to a previous functional state after the downloading of a new image.

As noted above, as newly-developed images increase in size (e.g. owing to provision of additional features, functions and the like) it is increasingly common for downloaded images to be sufficiently large, compared to the memory available for storing images in the router, that downloading requires erasure of some or all of the old image in order to make room in memory for the larger new image. In many situations it is impractical to address this problem by merely adding more memory to a router. Some routers may not be readily amenable to the addition of more memory and even when such modifications are possible, such modifications typically require that the router be disconnected from the network or placed out of service for a period of time, thus causing a interruption in the WAN or remote link, which is generally undesirable and, and in some (e.g. mission critical) situations may be unacceptable. Accordingly, it would be desirable to provide a method and apparatus for permitting a router to be restored to its former functional state, following the download of a new image, which does not necessitate interruption of a network link or placing a router out of service and which preferably does not require access to or manipulation of the existing router.

SUMMARY OF THE INVENTION

The present invention involves storing a local copy of a router image before (or while) it is erased from a router to make way for a new image. By storing the old image in a local device, the local area network can be used for reloading the stored old image back into the router, if desired, which is still possible even if the wide area link has been lost, e.g. due to errors in the newly-downloaded image. By storing a copy of the old image in a device which is different from the router, the present invention can be implemented without the need to take the router out of service or otherwise interrupt a link.

In one embodiment, implementation of the present invention includes coupling, to the local area network, a support device which includes sufficient memory to store at least one image, and preferably sufficient memory to store at least two images. The support device includes control and other logic (e.g. in the form of a microprocessor and appropriate programming) to effect storage of one or more images into memory e.g. via Trivial File Transfer Protocol (TFTP) such as described in the TFTP protocol Revision 2, RFC 1350 of the Network Working Group. Preferably the support device achieves such storage automatically (i.e. without the need for manual entry of commands or instructions or other human acts or intervention) in response to the downloading, into the local router, of a new image and/or in response to an impending or commanded erasure of an old image from the local router. In this way, a router which is inoperable (or operating undesirably) because of a defective or damaged image can be restored to a former functional state by loading, from the support device, via the local area network, a functional image copy.

DETAILED DESCRIPTION OF THE PREFERRED EMBODIMENTS

Figure 1:
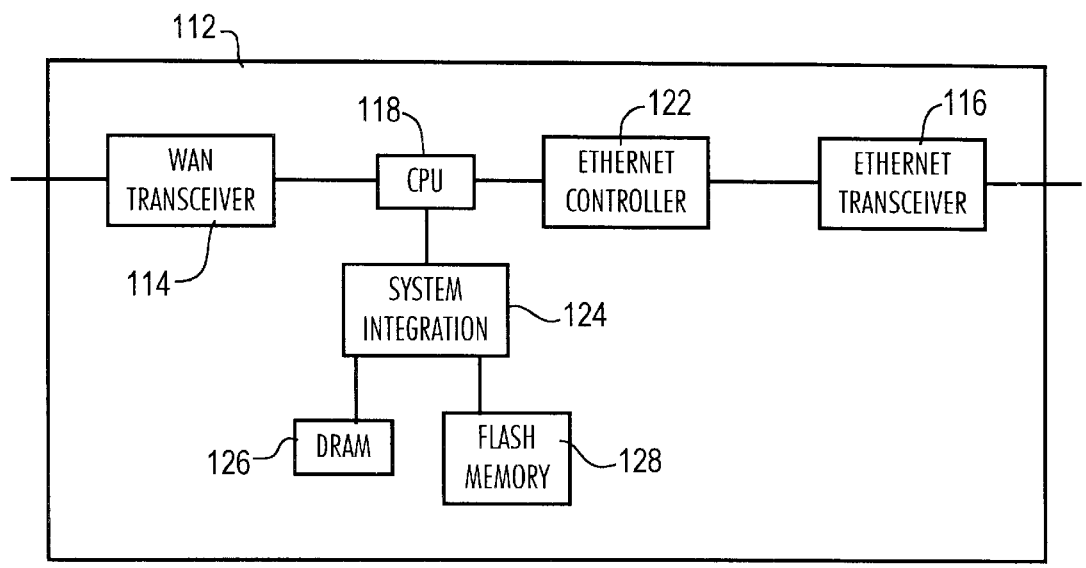
FIG. 1 is a block diagram of a router of a type previously available.

Before describing features of the present invention, certain aspects of devices and procedures which were previously used will be described. As depicted in FIG. 1, a typical router 112 includes a wide area network transceiver 114 for providing a link to remote devices or networks over a WAN link and a local area network transceiver such as an Ethernet transceiver 116 for communicating with local devices or a local area network. The Ethernet transceiver 116 is coupled to a microprocessor CPU (central processing unit) 118 via a Ethernet controller 122. Transceiver 114 is similarly coupled to the CPU 118. The CPU 118 is also coupled, e.g. via system integration circuitry 124 to one or more types of memory such as dynamic random access memory (DRAM) 126 and/or flash memory 128. The memory provided in the router 112 is used for a number of purposes including storage of data, scratch pad memory and the like, but preferably at least some nonvolatile memory such as a flash memory 128 is used for storing the router image, i.e. the operating system or similar programming which controls how the router operates. The amount of nonvolatile memory provided in the router should be sufficient to accommodate at least one full router image. However, many routers, (including numerous installed-based routers) may not have sufficient nonvolatile memory to store two router images, particularly since the size of router images tend to be progressively larger through time as new image versions are developed having additional features or functions.

Figure 2A:
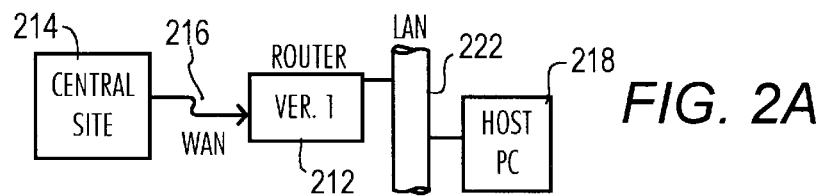
FIGS. 2A through 2D are block diagrams of a portion of a network at various stages during an image upgrade according to previous procedures.
Figure 2B:
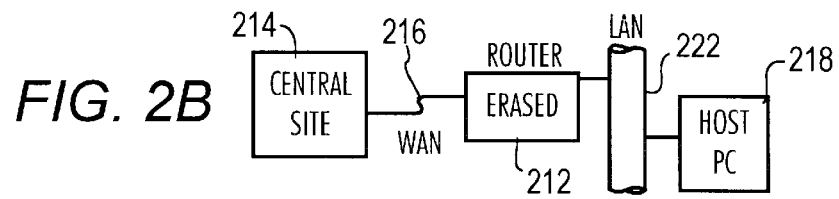
Figure 2C:
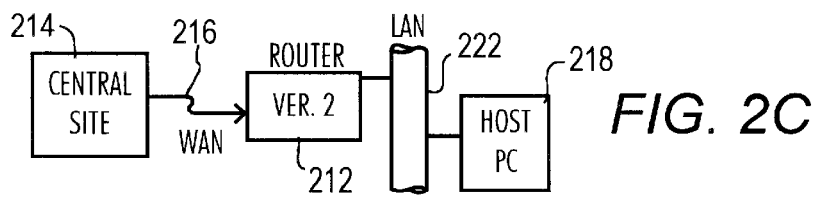

As depicted in FIG. 2A, a router 212 may be coupled to remote networks or devices such as a central computing site 214 by a wide area network 216 and to one or more local devices such as a host personal computer (PC) 218 via a local area network (LAN) 222. In the embodiment of FIG. 2A, the router 212 is running under the control of a operating system or image designated, in FIG. 2A, as version 1 (VER.1) which, typically, may have been downloaded from a remote site 214 over the wide area network link 216. At some point, it maybe desired to modify or upgrade the router image to a newer version, VER.2. As will be understood by those of skill in the art, updating the image can be performed by issuing instructions either from a local device such as the host PC 218 or a remote device, coupled over the WAN 216 to effect downloading the new image from the remote site 214, into the router 212. Because the router 212 has insufficient memory to store, in nonvolatile memory both the current VER.1 image and the new VER.2 image, it is necessary to erase some or all of VER.1 in order to make room in the router nonvolatile memory to accommodate the new image VER.2 and the resulting configuration with the VER.1 image erased from the router 212 is depicted in FIG. 2B. Preferably, even after erasure of the router image, the router still contains sufficient functionality to complete the storing of the new image VER.2, as it is downloaded from the remote site 214 (although the erased-memory router may not have the capability to perform other functions). The configuration following the downloading of VER.2 is depicted in FIG. 2C.

It is possible, however, that the new image VER.2 maybe damaged, defective or otherwise not fully functional or desirable due to any a number of factors such as uncorrectable errors in download transmissions, programming errors in VER.2, incompatibilities between VER.2 and the router hardware and the like. If the damage or defect is sufficiently severe, it maybe impossible for the router 212 to maintain the link 216 to remote sites, resulting in the configuration depicted in FIG. 2D (where the "X" represents an inoperable WAN link). In the situation depicted in FIG. 2D, it can be particularly difficult, burdensome or infeasible to return the router to its previous functioning state (i.e. the state of FIG. 2A) since the functional image VER.1 could not be retained in the router memory and was erased (as shown in FIG. 2B). Since there are no longer any functioning links 216 to remote sites from which a functioning image might be downloaded, it may be necessary to manually obtain a functional router image (such as purchasing or obtaining a copy of such an image on a magnetic disk or similar medium) and to manually load such copy onto the router. These procedures may require access to the router, and may take a substantial amount of time and effort (if they can be accomplished at all) during which time the link 216 is inoperable.

Figure 2D:
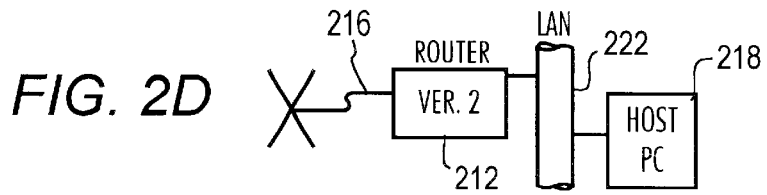
Figure 3:
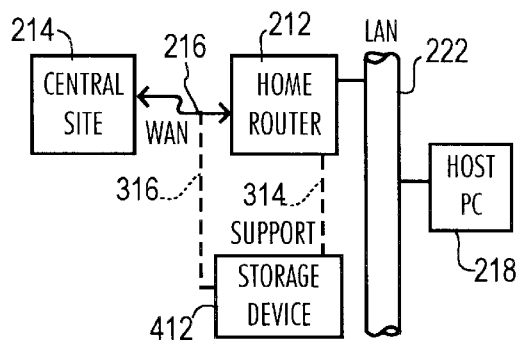
FIG. 3 is a block diagram of a portion of a network useable in connection with a router image upgrade according to an embodiment of the present invention.

FIG. 3 depicts one fashion, according to an embodiment of the present invention, of avoiding the undesirable situation depicted in FIG. 2D. As depicted in FIG. 3, a router support device or storage device 412 is coupled to the local area network 222. The support device 412 contains sufficient memory, preferably nonvolatile memory, to store at least one full copy of a router image and, in some embodiments, two or more router image copies.

Figure 4:
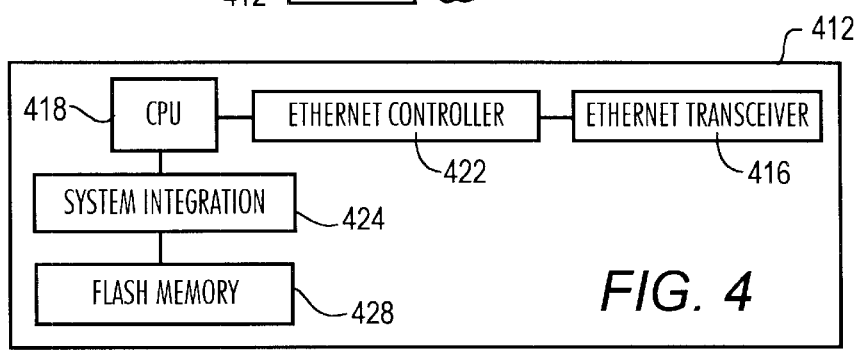
FIG. 4 is a block diagram of a support device or storage device which can be used for a local storage of an image according to an embodiment of the present invention.

FIG. 4 depicts, in block diagram fashion, a support device of a type that can be used in embodiments of the present invention. In the embodiment depicted in FIG. 4, a CPU 418 is coupled, via an Ethernet controller 422 to an Ethernet transceiver 416. The CPU 418 is also coupled, e.g. via system integration circuitry 424 to at least a flash memory 428 or other nonvolatile memory with sufficient capacity to store at least one copy of a router image and, in some embodiments, two or more copies. Although flash memory 428 is depicted in FIG. 4, other types of memory can be used such as nonvolatile RAM (NVRAM), or static random access memory (SRAM). Although there are certain similarities between the support device 412 of FIG. 4 and previously available routers 112, there is no need for the support device 412 to have a direct wide area network link and thus no need for a WAN transceiver 114. However, since many of the components and functions desired for a router support device can be found in previously available routers 112, it is possible to use a router 112 (possibly with modified software and possibly with additional memory, if desired or needed) as a support device 412, in which case, a WAN transceiver 114 would simply go unused. In one embodiment of the invention, a Cisco® router, supplemented with flash memory can be used as the router support device 412.

Figure 5A:
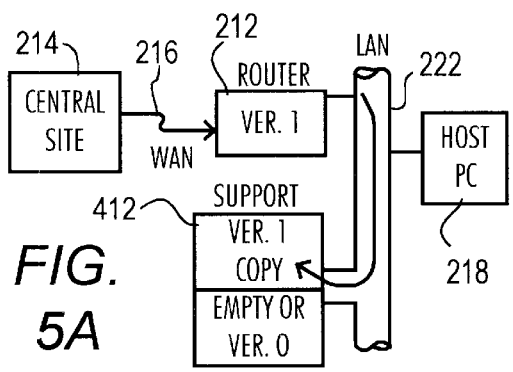
FIGS. 5A through 5M are block diagrams of a portion of network at various stages during updates of router images according to an embodiment of the present invention.
Figure 7A:
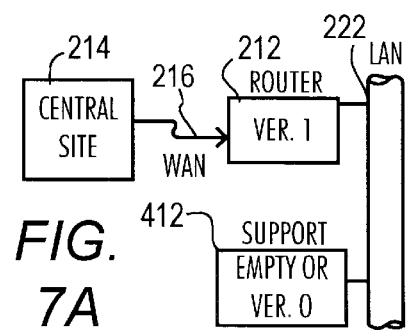
FIGS. 7 through 7L are block diagrams depicting a portion of a network at various stages during router image updates according to an embodiment of the present invention.
Figure 5B:
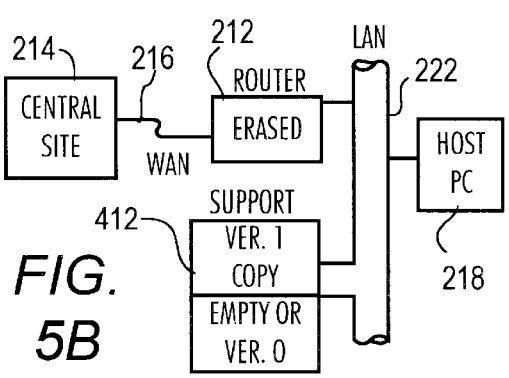
Figure 5C:
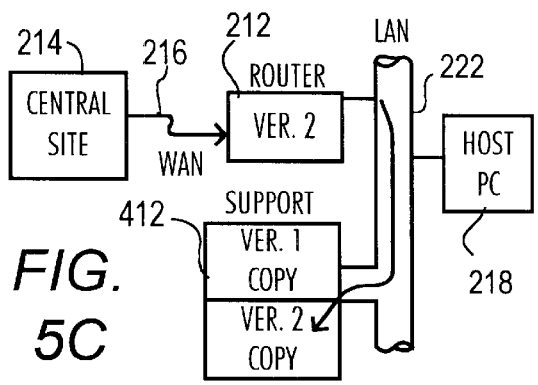
Figure 5D:
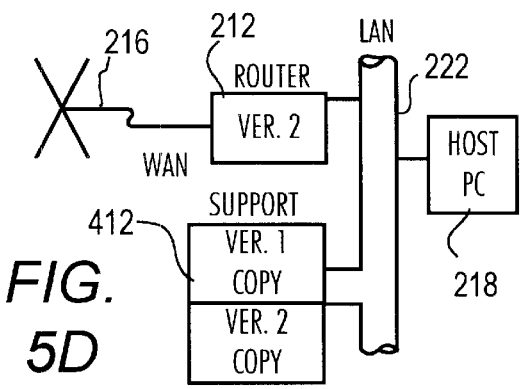
Figure 5E:
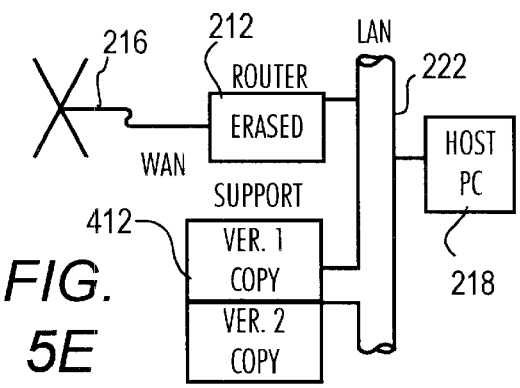
Figure 5F:
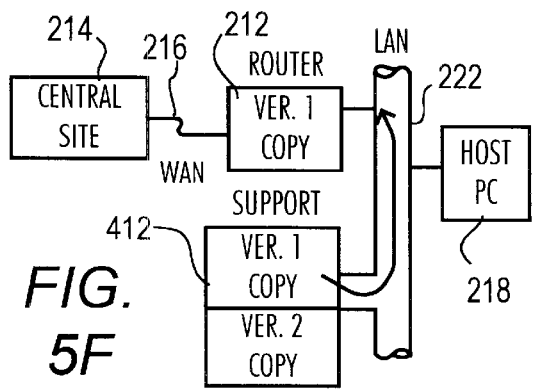
Figure 5G:
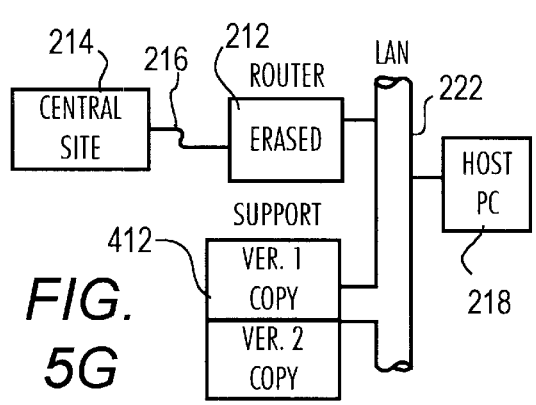

FIGS. 5A through 5M provide an example of the configuration of a portion of a network at various stages during downloading of router images according to an embodiment of the present invention. FIG. 6 is a corresponding flow chart depicting various steps performed respectively by a remote site 612 by the router 614 and by the support device 616. In the configuration of FIG. 5A VER.1 of the router image is output 618 from the from the central site 214 for loading into the router 212, and storage therein 622 VER.1 image is also sent via the local area network 222 to the support device 412 and accordingly a copy of image VER.1 is stored 624 in the support device 412.

Preferably, version 1 of the software image can be stored in the support device 412 substantially automatically, i.e.

without the need for humans to provide input or other instructions or commands in order to achieve such storage. Such automatic storage can be achieved in a number of fashions. The storage support device 412 can be provided with an address which is identical to or mimics the router address, such that both the router 212 and the router support device 412 recognize the image as being directed to itself. Alternatively, local devices such as the router 212, host PC 218 or router support device 412 can monitor communications and, upon recognizing an image download event, initiate procedures to forward a copy of the downloaded version over the LAN 212 to the router support device 412. Those of skill in the art will understand how to configure local components to monitor for image download events and to, in response, effect storage of a copy in the router support device 412, after understanding the present disclosure.

Assuming, for purposes of the present illustration, that router image VER.1 is a functional image, following the downloading illustrated in FIG. 5A, the router can begin normal operations 626.

At some point, in the illustrated example, a decision is made to upgrade the router image. Such a decision may be made by and/or implemented by decisions made locally, e.g. through input provided by a local device such as the host PC, or through input provided from a remote location such as the central site 214. In any case, in the illustrated example, some or all of the router image VER.1 is erased 628 to make room in the router memory for the new image, as depicted in FIG. 5B. Following the erasure, the central site 214 outputs 632 the new VER.2 router image which is stored 634 in the router and also sent, via the LAN 222 to the support device 412 for storage 636 in the support device 412, preferably automatically in response to detection of downloading the new image, substantially as described above. As depicted in FIG. 5C, the support device 412 preferably has sufficient memory to store the new image VER.2 without requiring erasure of the previously stored image VER.1. Accordingly, as depicted in 5C, at this state, the support device 412 contains a complete copy of VER.1 and a complete copy of VER.2 while the router has stored, therein, image VER.2. If VER.2 operates properly 636, normal router operations can resume 638. However, if VER.2 is seriously flawed, including situations in which VER.2 is so seriously flawed that the WAN link is inoperable 642, as illustrated in FIG. 5D, it may be necessary or desired to replace router image VER.2. According to the present invention, it is possible to replace VER.2, even though the WAN link may be inoperable 642 by reloading VER.2 from the support device 412. Accordingly, in response to instructions entered e.g. through a local device such as host PC 218, reloading procedures are initiated which include erasure of VER.2 from the router 644, as depicted in FIG. 5E, outputting the copy of image VER.1 from the support device 646 and storing the VER.1 copy in the router 648 as depicted in FIG. 5F. At this point, since VER.1 has been restored, the router has been restored to its previous functional configuration and normal router operations can resume 652.

At some point, in the illustrated example, it is decided to upgrade the router with yet another image, VER.3. Accordingly, VER.1 is erased from the router memory 654 to make room for the new image in the router memory as depicted in FIG. 5G. The new VER.3 image is output 656 from the central site 214, is stored in the router 658 and a copy is also sent, via the local area network 222 for storage 622 in the support device 412. As depicted in FIG. 5G, prior to downloading of VER.3, the support device 412 contains a copy of VER.1 and a copy of VER.2. If it is assumed that the support device 412 does not contain sufficient memory to store three images, in order to store VER.3 into the support device 412, it will be necessary to erase at least one of VER.1 or VER.2. In the illustrated situation, since it had been determined that VER.2 did not operate properly 636, VER.3 is stored in the support device 412 by overwriting VER.2. Accordingly, in the configuration shown in FIG. 5H, the support device 412 contains one complete copy of VER.1 and a complete copy of VER.3. In this way, if VER.3 is found to be defective or if it is otherwise desired to replace VER.3, a functional image, namely VER.1, is available in the support device 412 for reloading into the router 212 (which would not be the case if VER.3 had overwritten VER.1, rather than overwriting VER.2).

This example illustrates that it is important to make proper decisions regarding which images in the support device 412 to erase or overwrite. In one embodiment, the procedures may be configured to prompt a user to select which of two or more images stored in the support device 412 should be overwritten or erased when additional space is needed in support device 412. In another embodiment, the system can be configured such that defective or undesired images are automatically erased. For example, the system can be configured such that if a router image is erased (from the router) which corresponds to a router image currently stored in the support device 412 (such as when VER.2 was erased from the router while VER.2 was also stored in the support drive 412 as depicted in FIG. 5E) that version will be automatically erased from the support device 412. Alternatively, the system can be configured such that if a version stored in the support device 412 is reloaded into the router, as depicted in FIG. 5F, one or more other versions stored in the support device 412 will be automatically erased.

Figure 5H:
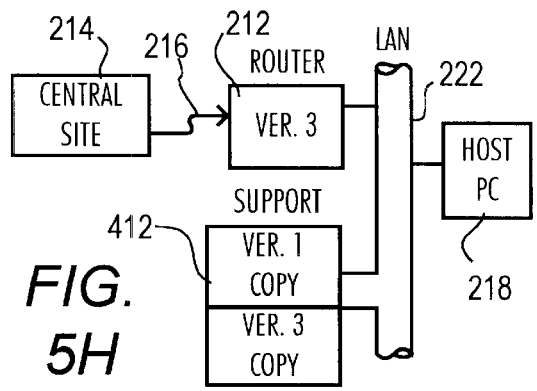
Figure 5I:
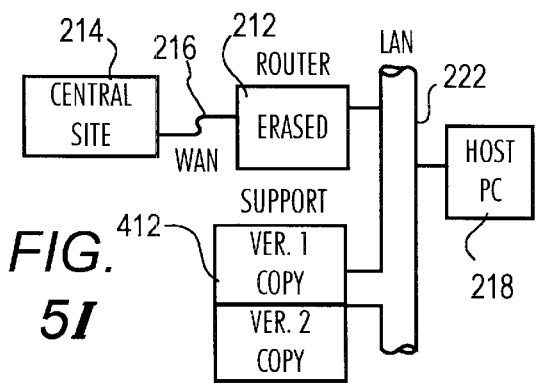
Figure 5J:
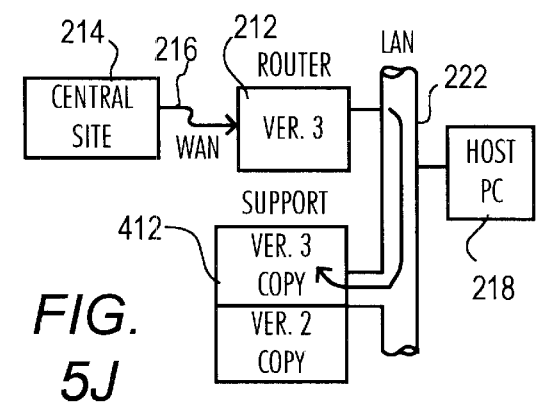
Figure 5K:
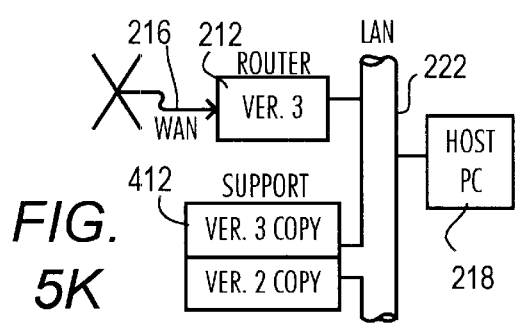
Figure 5L:
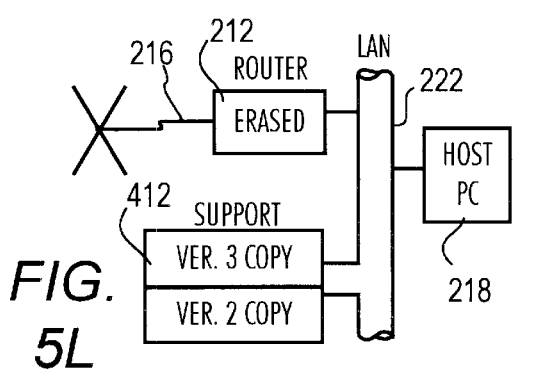
Figure 5M:
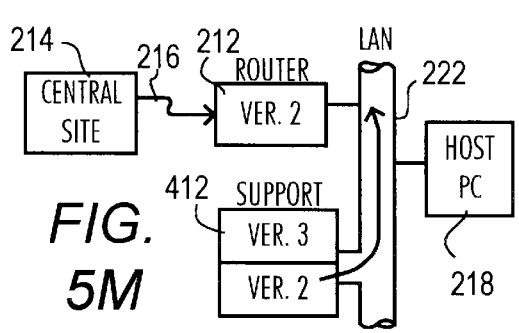
Figure 6:
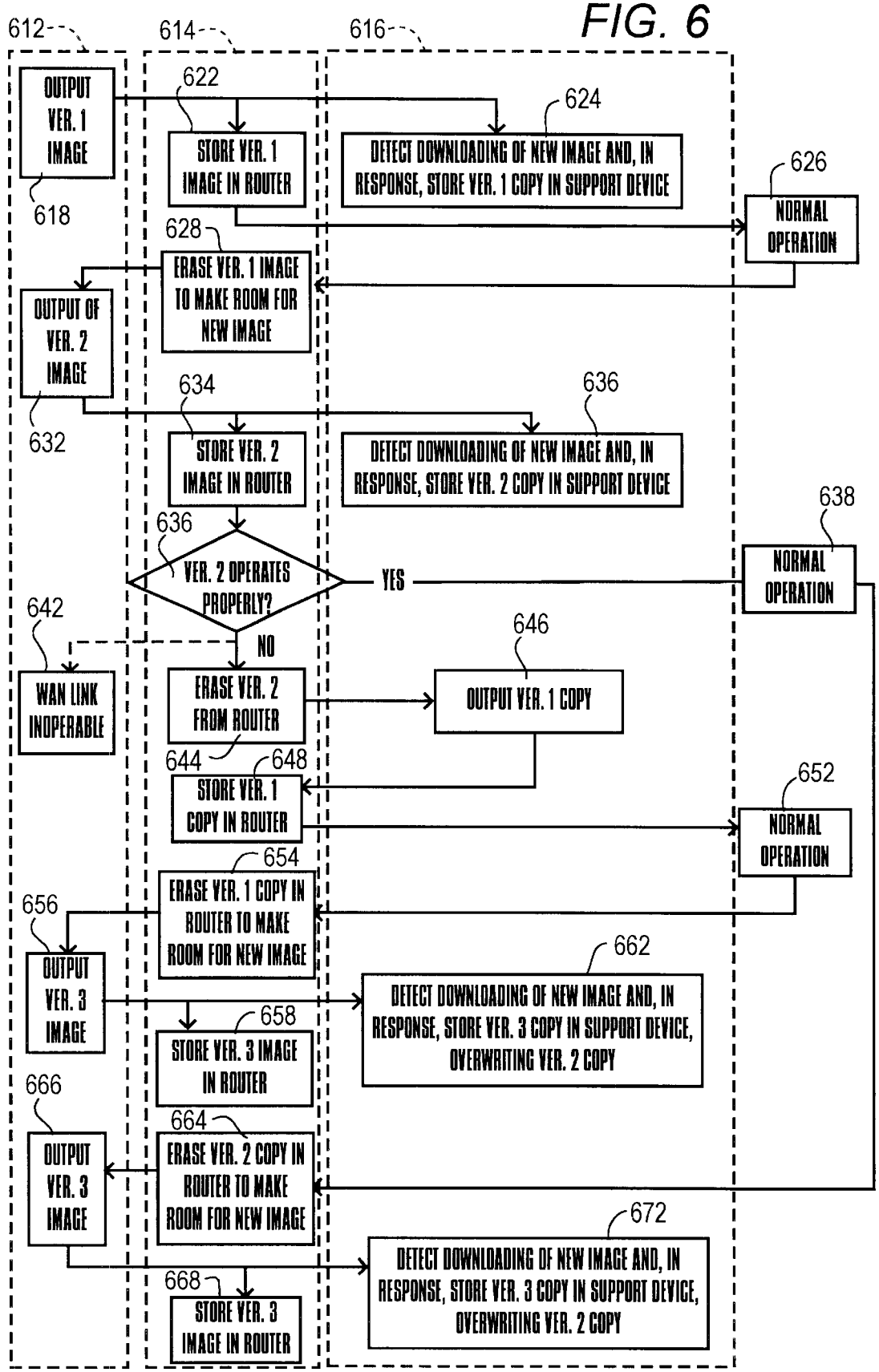
FIG. 6 is a flow chart depicting steps for router image updating according to an embodiment of the present invention.

Overwriting of VER.2 as depicted in FIG. 5H can be contrasted with the situation when VER.3 is downloaded after VER.2 was determined to operate properly 638. If VER.2 operates properly 638 but it is desired to upgrade VER.2 with VER.3, VER.2 will be erased from the router 664 as depicted in FIG. 5I. VER.3 will be output 666 from the remote location 214 and stored in the router 668 and also sent, via the LAN 222 for storage in the support device 672 as depicted in FIG. 5J. As in the example of FIG. 5G and 5H, VER.3 will overwrite either VER.2 or VER.3. However, in the example of FIG. 5J, VER.3 overwrites VER.1 (rather than overwriting VER.2). This is a useful selection since, in the present example, VER.2 is a properly-functioning image. Although VER.1 is also a properly-functioning image, by overwriting VER.1, the present invention provides for storage, in the support device 412 of the most recent properly-functioning image. Thus, by properly selecting which images in the support device 412 to erase or overwrite, the present invention makes it possible to always have the capability of replacing a newly downloaded image with the most recent properly-functioning image. For example, if it is determined that VER.3 is not properly functioning and has resulted in loss of the remote link 216 as depicted in FIG. 5K, VER.3 maybe erased from the router (FIG. 5L) and VER.2 can be reloaded from the support device 412 into the router 212 as depicted in FIG. 5M.

Figure 7B:
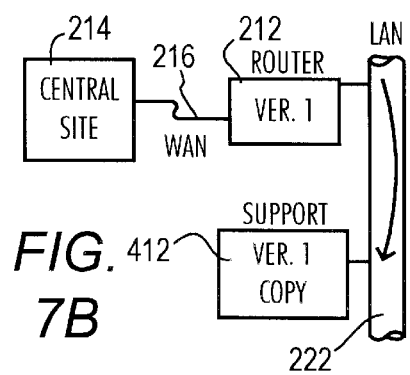
Figure 7C:
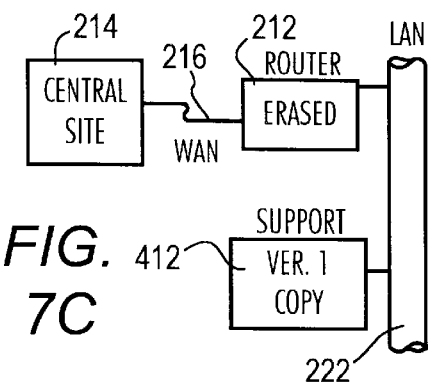
Figure 7D:
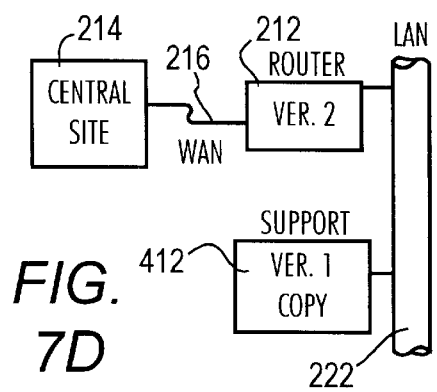
Figure 7E:
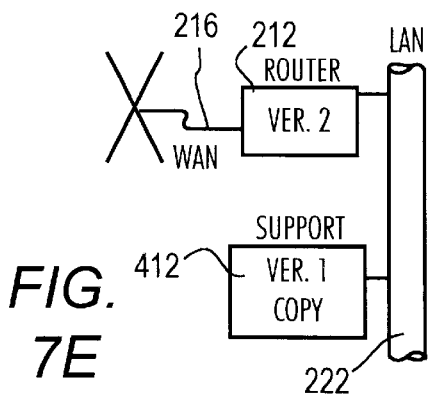
Figure 7F:
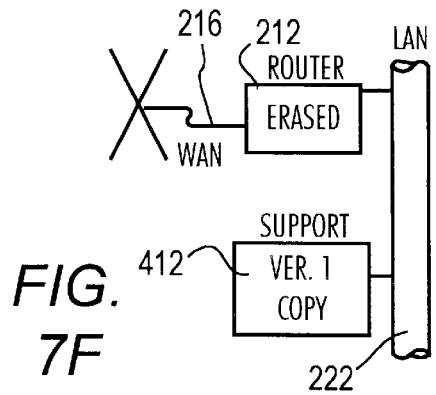
Figure 7G:
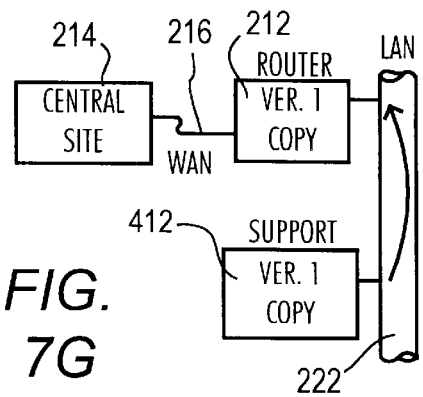
Figure 7H:
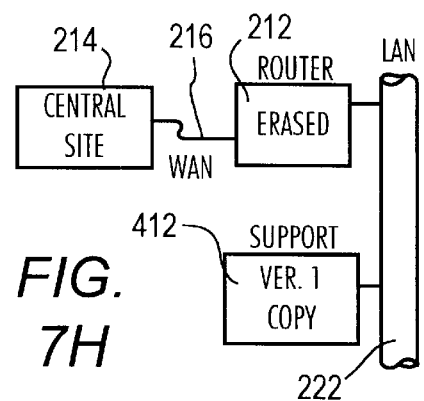
Figure 7I:
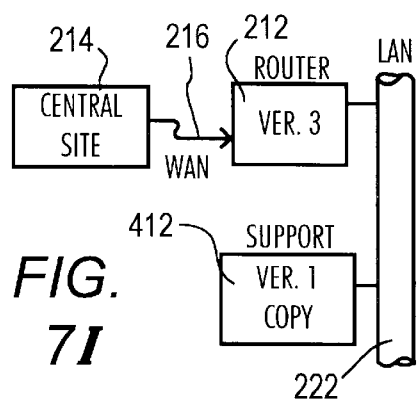

Although FIGS. 5A through M and 6 illustrate an example in which the support device 412 has sufficient memory to store at least two images, it is also possible to implement the present invention using a support device which can store only single image. FIGS. 7A through 7L illustrate portions of a network at various stages of downloading router images and the corresponding flow chart of FIG. 8 depicts steps performed during such image downloading by a remote device 812, by the router 814, and by support device 816 respectively. Initially, VER.1 of the image is output 818 from the central site and stored in the router 822. Although, it is possible to configure a system in which VER.1 will be simultaneously stored in the support device 412 (similar to the embodiment of FIG. 5A). The example of FIGS. 7A though 7L illustrate that it is possible to configure a system in which images are not sent to the support device 412 until a later time. In the illustration of FIG. 8, router normal operations are initiated 824. At some point, a decision is made to update the router image and appropriate commands are input either locally or remotely (similar to the fashion described above in connection with FIGS. 5A through 5M). The issuance of such commands is detected and, in response, a copy of VER.1 is sent, via the LAN 222 to the support device 412 for storage therein 826 as depicted in FIG. 7B. The VER.1 image is erased from the router 828 to make room for the new image as depicted in FIG. 7C. The new image VER.2 is output from the remote site FIG. 32 and stored in the router 834 as illustrated in FIG. 7D. As shown in FIG. 7D, at this point, the router contains a copy of VER.2 and the support device contains a copy of VER.1. If VER.2 operates properly 836, normal operations can resume 838. However, if VER.2 does not operate properly, possibly causing the WAN link to be inoperable 842 as illustrated in FIG. 7E, it may be desired to replace VER.2. Accordingly, VER.2 is erased from the router 834 as illustrated in FIG. 7F. VER.1 is then output from the support device 846 and stored back into the router 848 as illustrated in FIG. 7G. In this fashion the router 212 has been returned to its previous functional state, with the VER.1 image stored therein, and normal operations can be resumed 852. If it is desired to, thereafter, upgrade the router with image VER.3, the commands for such updating maybe detected 854, similar to previous detection 826. However, since the operable image VER.1 is already stored in the support device 412, there is no need for restoring VER.1 from the router into the support device 412 (although such an operation will do no harm and can be performed if desired). VER.1 is then erased from the router 856 as depicted in FIG. 7H. VER.3 is output from the remote site 858 and stored in the router 862, as illustrated in FIG. 7I. If it turns out that VER.3 is defective or it is otherwise desired to replace VER.3, VER.1 is available in the support device 412 for loading into the router as shown in FIG. 7I.

Figure 7J:
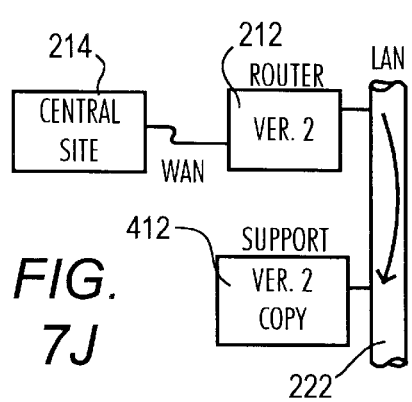
Figure 7K:
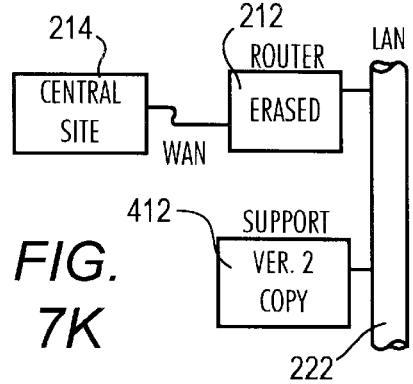
Figure 7L:
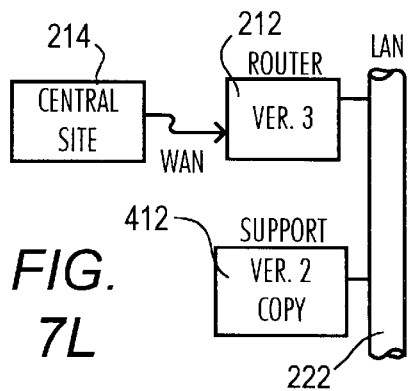
Figure 8:
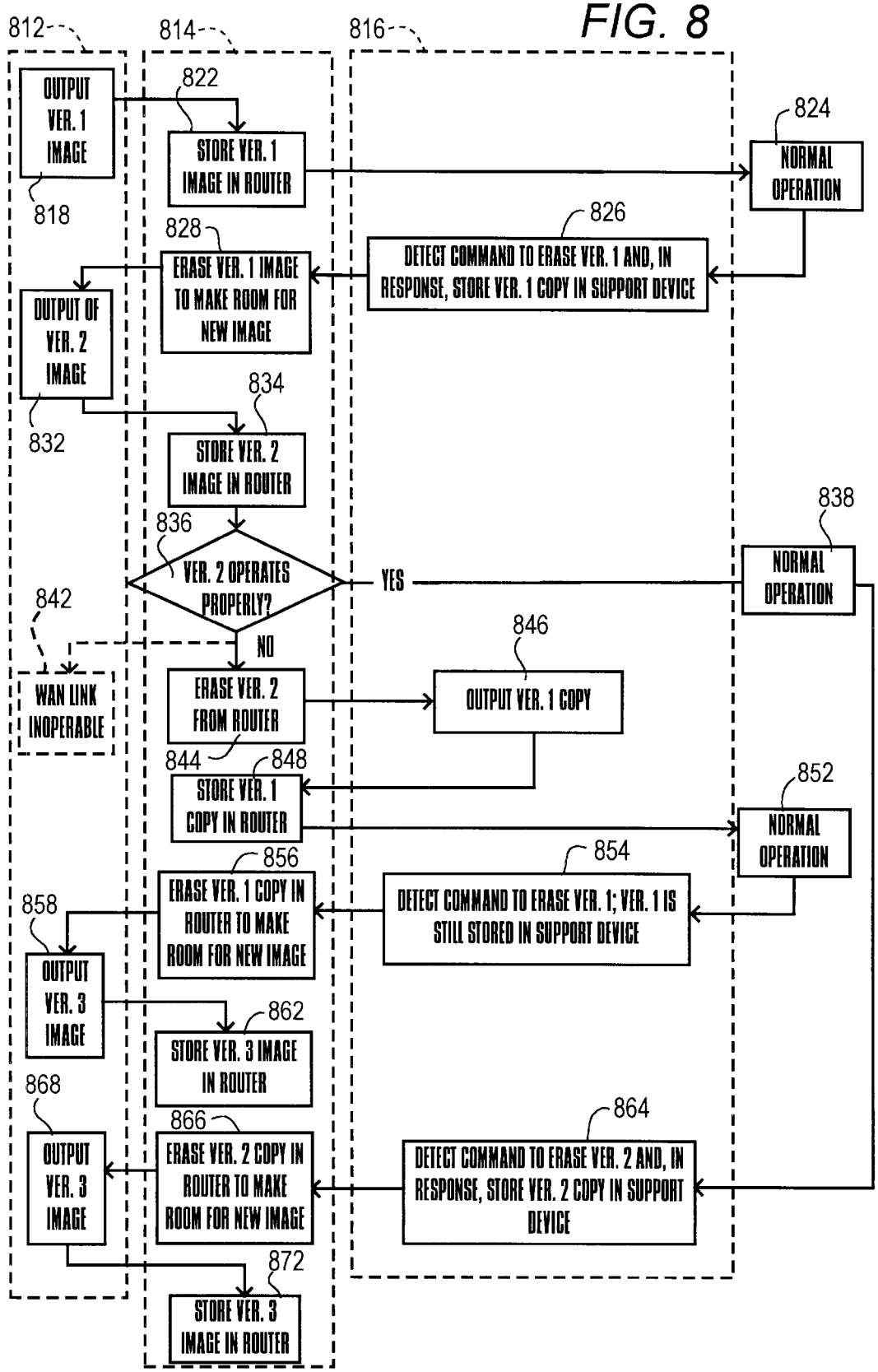
FIG. 8 is a flow chart illustrating steps performed during router image updates according to an embodiment of the present invention.

If it had been determined that VER.2 was operating properly or acceptably 838, and a decision was thereafter made to replace VER.2 with VER.3, preferably, in response to detecting the commands to erase VER.2 from the router, VER.2 will first be sent via the LAN 222 for storage 864 in the support device 412, as depicted in FIG. 7J. This operation will overwrite the copy of VER.1 formerly stored in the support device 412. In this way, the support device 412 will contain a copy of the most recent functional or operable image. VER.2 is then erased from the router 866 as depicted in FIG. 7K and the new image VER.3 is output 869 from the remote site and stored 872 in the router as depicted in FIG. 7L. Using these techniques, the image stored in the support device 412 will be the most recent operable image. Thus, when VER.2 was determined to be operate properly 838, after a download of VER.3, the support device 412 will contain a version of a copy of VER.2 as depicted in FIG. 7L, whereas if VER.2 is determined not to operate properly 836, after VER.3 is downloaded, the support device 412 will contain a copy of VER.1, as depicted in FIG. 7I (since, in that situation, VER.1 is the most recent operable image).

In light of the above description, a number of advantages of the present invention can be seen. The present invention facilitates reloading of an operable router image following the download of a defective or otherwise undesirable router image. Preferably, the present invention can provide for storage of the desired or necessary images without the need for entry of human commands to effect such storage. The present invention can be implemented without requiring placing the router out of service or interrupting a WAN link and preferably can be implemented without the need for physically accessing the router. The present invention provides for storage of at least the most recent operable image, preferably in an automatic fashion without the need for human decisions or intervention.

A number of variations and modifications of the present invention can be used. It is possible to provide certain features of the invention without providing others. For example, it is possible to provide for storage of multiple router images without providing for automatic detection of image downloading. Although embodiments of the present invention have been described in connection with restoring a router to its former functional state following downloading of a new image, the present invention can also be used for restoring the router to its former functional state after the router image has been modified or destroyed (e.g. as a result of a portion of the image being written-over or through other software or hardware failure). Although embodiments of the invention have been described in connection with restoring the previous functional state of a router, the present invention can be used in connection with devices other than routers, such as network bridges, gateways switches and the like. Although the embodiments of the present invention have been described which involve using a support device for storing operating system or image information, it is also possible to use the support device for storing copies of other information, in addition to or in place of image information such as router tables. Although embodiments of the present invention have been described which involve the use of router hardware as a support device, other hardware can also be used as a support device (if provided with appropriate software generally as described herein) including certain types of web servers such as a Cisco Micro Web Server™ 200, a personal computer or work station, a unix computer and the like. Although embodiments of the present invention have been described in which the router support device is coupled indirectly to the router, such as via LAN 222 it is also possible to provide configurations in which the support device is directly coupled 314 to the router 212 or in which the storage device 412 includes a WAN link 316, e.g. for parallel downloading of images to a router 212 and support device 412, e.g. as indicated by phantom lines in FIG. 3.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangable and/or equivalent structures, functions, ranges or steps to those claimed, whether or not such alternate, interchangable and/or equivalent structures, functions, ranges or steps are disclosed herein, and without intending to publicly dedicate any patentable subject matter.

What is claimed is:

1. A method for restoring a router image for use in a multi-network computing system including a router which is coupled to both a local area network (LAN) and at least a first remote site, over a wide area network (WAN) link, said router having a memory for storing router images, said router images providing router LAW or operating systems for controlling the functioning of said routed, the method comprising:

coupling at least a first support device to said LAN without coupling said first support device to said remote site, said first support device having a memory;

downloading a first router image from said remote site, over said WAN link to said router memory and simultaneously transmitting a copy of said fist router image over said LAN to said first support device;

storing, in said memory of said first support device, said copy of said first router image;

erasing said first router image from said router memory;

downloading a second router image from said remote site, over said WAN link to said router memory and simultaneously transmitting a copy of said second router image over Ed LAN to said first support device; and transmitting said copy of said first router image from said support device to said router, for storing in said memory of said router.

2. A method, as claimed in claim 1, wherein said first support device comprises a second router.

3. A method, as claimed in claim 2 wherein said coupling of said second router to said LAN is provided in the absence of coupling said router to a remote site.

4. A method, as claimed in claim 1, wherein said copy of said first router image is stored in said memory of said first support device following transmitting said copy of said first router image from said router, over said LAN, to said first support device.

5. A method, as claimed in claim 4 wherein said transmitting of said copy of said first router image from said router is performed substantially simultaneously with downloading of said first router image to said router from said remote site.

6. A method, as claimed in claim 1 further comprising storing a second router image, different from said first router image, into said router prior to said step of trans said copy of said first router image from said support device to said router.

7. A method, as claimed in claim 6 further comprising storing said second router image in said support device, without erasing said first router image from said support device.

8. A method as claimed in claim 7 wherein said step of storing said second router image in said support device is performed substantially simultaneously with said step of storing said second router image into said router.

9. A method as claimed in claim 7 further comprising storing a third router image in said support device while erasing at least a portion of said second router image from said support device if said first router image has been copied from said support device to said router.

10. A method as claimed in claim 7 further comprising storing a third router image in said support device while erasing at least a portion of said first router image from said support device if said first router image has not been copied from said support device to said router.

11. A method, as claimed in claim 7, further comprising prompting for user input to select between erasure of said first router image and said second router image before storing a third router image in said support device.

12. A method, as claimed in claim 6 further comprising said second router image from said router prior to said step of transmitting said copy of said first router image from said support device to said router.

13. A method as claimed in claim 12 further comprising storing said second router image in said support device after said step of storing said second router image in said router and before said step of erasing said second router image from said router.

14. A method for restoring a router image for use in a multi-network computing system including a first router which is coupled to both a local area network (IAN) and at least a first remote site, over a wide area network (WAN) link, said first router having a flash memory for storing router images, said router images providing router operating systems for controlling the functioning of said fast router, the method comprising:

coupling a second router to said LAN, without coupling said second router over a WAN, said second router having sufficient memory to store at least two images;

downloading a first image from said remote site, over said WAN link to said first router flash memory and simultaneously transmitting said first image over said LAN to said second router for storage in said memory of said second router, erasing said first image from said flash memory of said first router, downloading a second image from said remote site, over said WAN link to said first router flash memory and simultaneously transmitting said second image over said LAN to said second router for storage in said memory of said second router without erasing said first image from said memory of said second router, wherein said second image in said first router renders said first router incapable of maintaining said WAN link;

erasing said second image from said flash memory of said first router, and transmitting said first image from said second router, over said LAN, to said fist router, for storing in said flash memory of said first router.

15. Apparatus for restoring a router image for use in a multinetwork computing system including a router which is coupled to both a local area network (LAN) and at least a first remote site, over a wide area network (WAN) link, said router having a memory for storing router images, said router images providing router operating systems for controlling the functioning of said routers, the apparatus comprising:

a first support device, coupled to said router, said first support device having a memory;

means for automatically storing, in said memory of said first support device, a copy of a first router image as said first router image is being stored in said router;

means for automatically storing, in said memory of said first support device, a copy of a second router image as said second router image is being stored in said router, means for erasing said first and said second router images from said memory of said router; and means for transmitting said copy of said first router image from said support device to said router, for storing in said memory of said router.

16. Apparatus, as claimed in claim 15, wherein said first support device is coupled to said router by said LAN.

17. Apparatus, as claimed in claim 16, wherein said means for transmitting said copy includes said LAN.

18. Apparatus, as claimed in claim 15, wherein said first support device comprises a second router.

19. Apparatus, as claimed in claim 15, wherein said means for automatically storing includes means for transmitting said copy of said first image from said router, over said LAN to said first support device.

20. Apparatus, as claimed in claim 15, wherein said means for automatically storing said second router image in said support device, without erasing said first router image from said support device.

21. Apparatus as claimed in claim 15 further comprising means for automatically selecting whether to erase said first router image or said second router image from said first support device before storing a third router image in said support device.

* * * * *

UNITED STATES PATENT AND TRADEMARK OFFICE
CERTIFICATE OF CORRECTION

PATENT NO. : 6,438,606 B1
DATED : August 20, 2002
INVENTOR(S) : Paul Ward

It is certified that error appears in the above-identified patent and that said Letters Patent is hereby corrected as shown below:

Column 9,
Line 20, between "router" and "operating" delete "LAW or".
Line 21, delete "routed" and insert -- routers --.
Line 36, delete "Ed" and insert -- said --.

Column 9,
Line 57, delete "trans" and insert -- transmitting --.

Column 10,
Line 15, insert -- erasing -- after "comprisng".
Line 56, delete "multinetwork" and insert -- multi-network --.

Signed and Sealed this

Twenty-ninth Day of June, 2004

JON W. DUDAS
*Acting Director of the United States Patent and Trademark Office*